Feb. 6, 1962 R. M. FOX ETAL 3,019,469
WINDSHIELD CLEANER
Filed Jan. 31, 1958 6 Sheets-Sheet 1
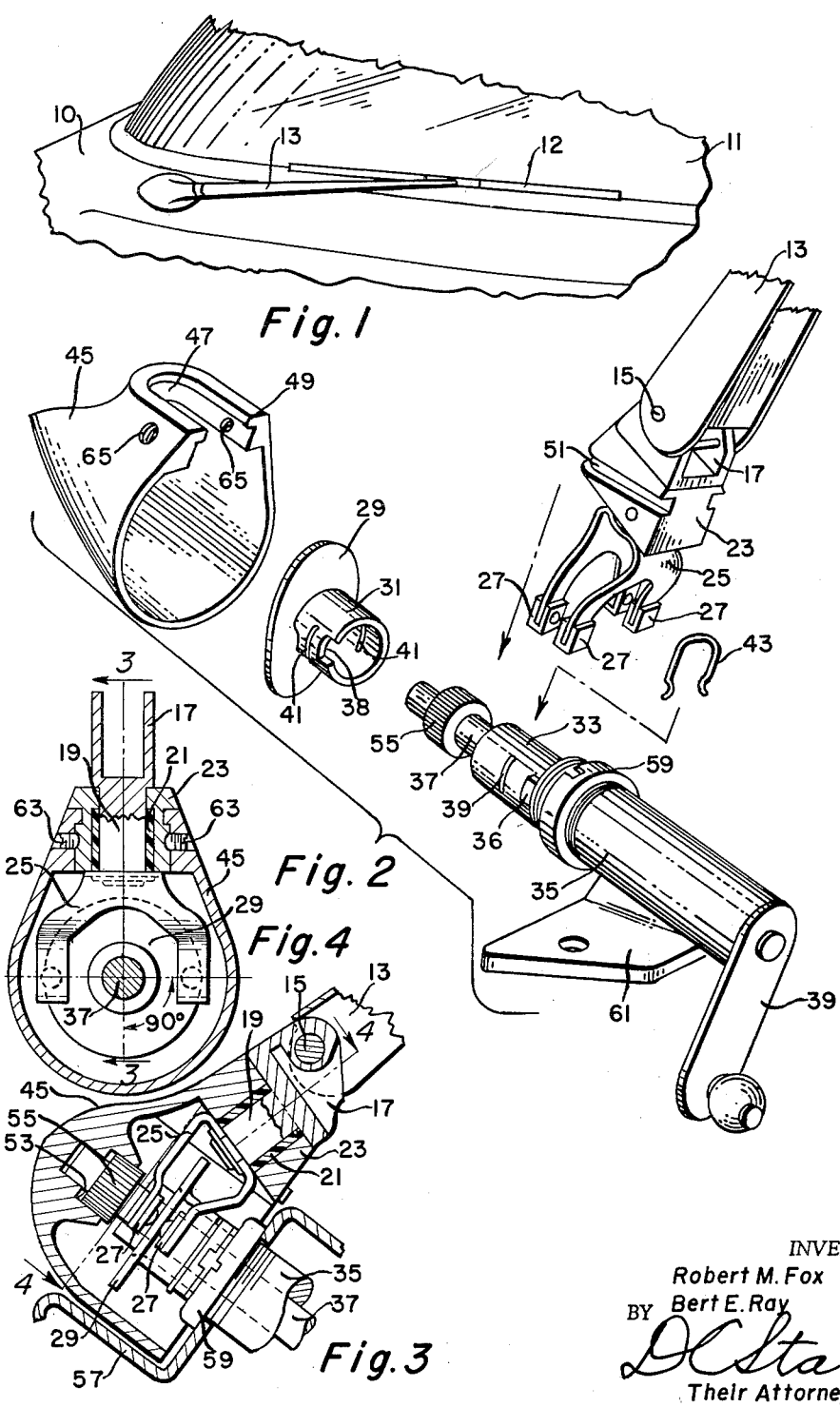
INVENTORS
Robert M. Fox
Bert E. Ray
BY
D. C. Staley
Their Attorney Feb. 6, 1962 R. M. FOX ETAL 3,019,469
WINDSHIELD CLEANER
Filed Jan. 31, 1958 6 Sheets-Sheet 2

INVENTORS
Robert M. Fox
Bert E. Ray
BY D.C. Staley
Their Attorney

Feb. 6, 1962 R. M. FOX ETAL 3,019,469
WINDSHIELD CLEANER
Filed Jan. 31, 1958 6 Sheets-Sheet 4
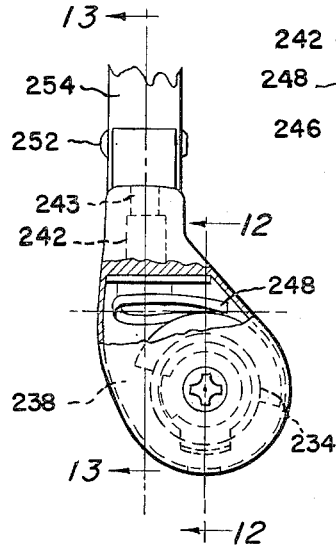
Fig. 11
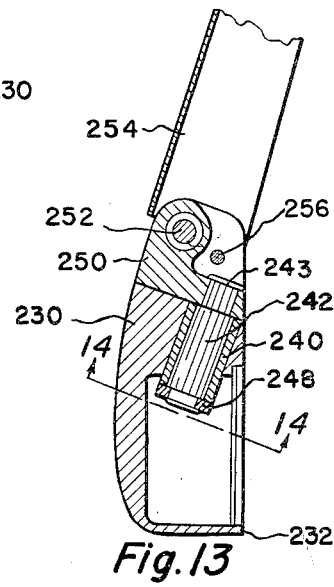
Fig. 14
Fig. 13
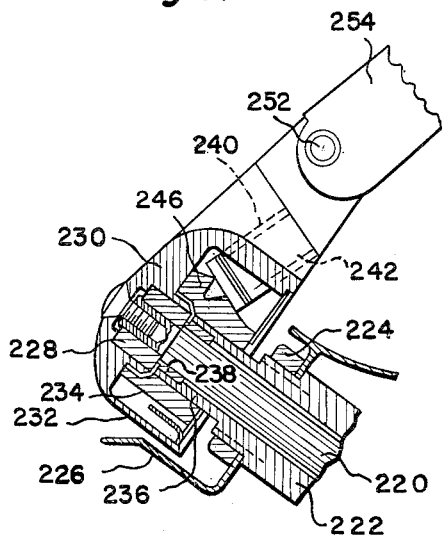
Fig. 12
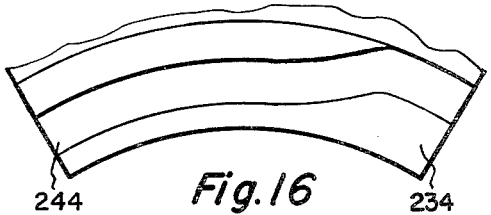
Fig. 16
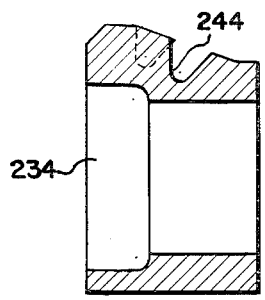
Fig. 15
INVENTOR.
Robert M. Fox.
Bert E. Ray.
BY
DC Staley
THEIR ATTORNEY

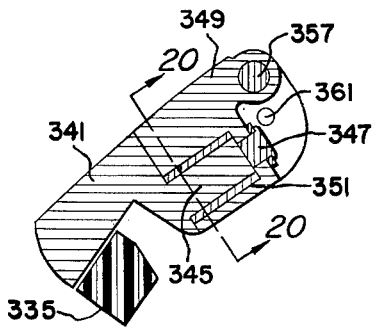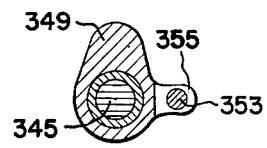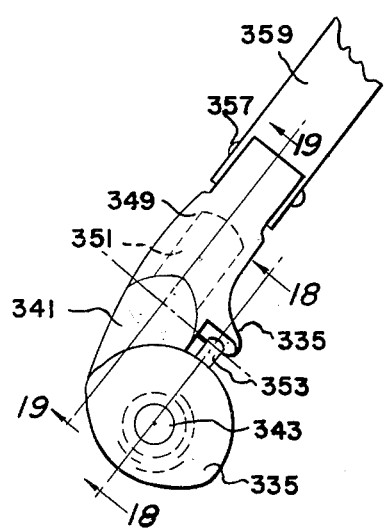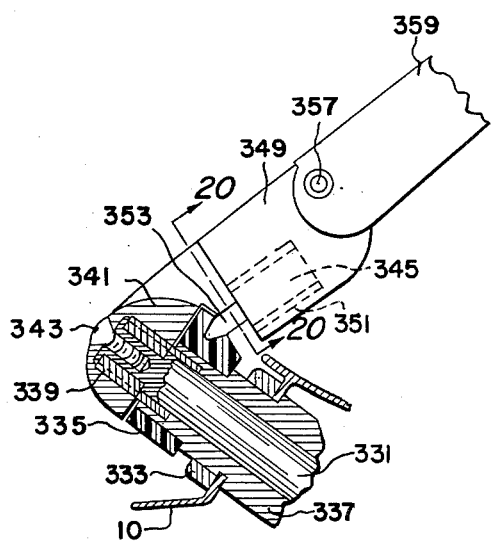

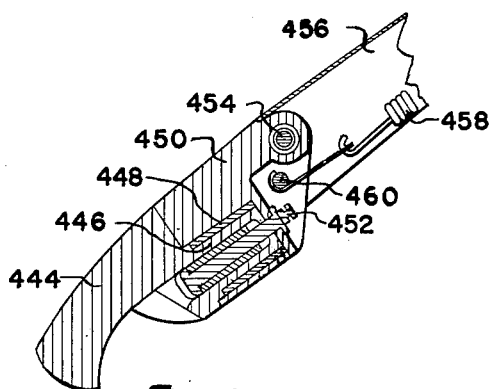
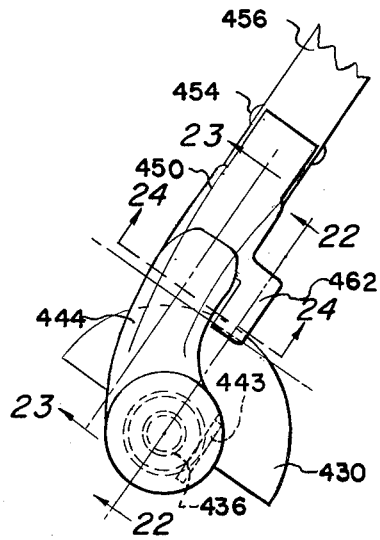
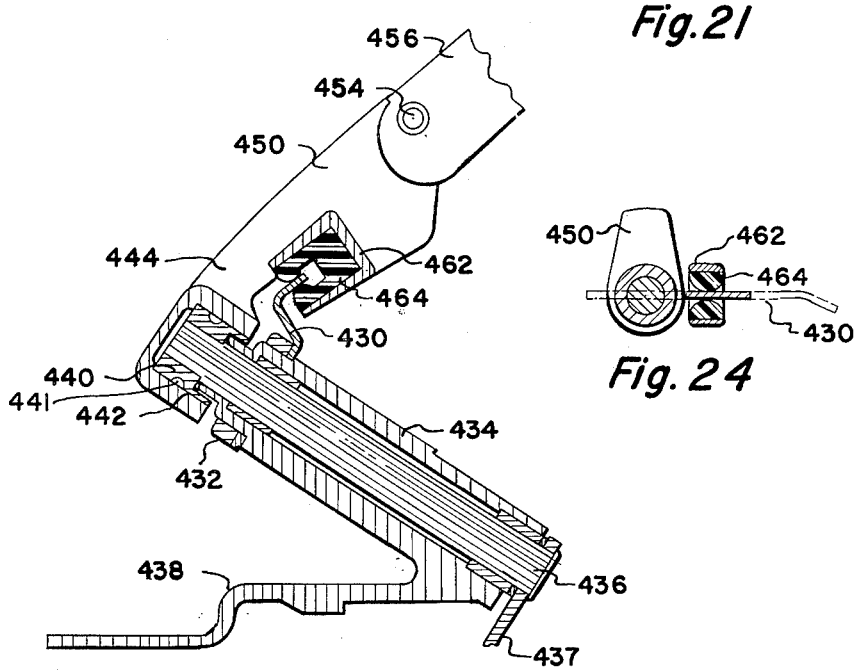

United States Patent Office 3,019,469
Patented Feb. 6, 1962

1

3,019,469
WINDSHIELD CLEANER
Robert M. Fox, Detroit, Mich., and Bert E. Ray, Houston, Tex., assignors to General Motors Corporation, Detroit, Mich., a corporation of Delaware
Filed Jan. 31, 1958, Ser. No. 712,490
2 Claims. (Cl. 15—250.21)

This invention pertains to windshield wipers for curved, wrap-around and other irregularly shaped windshields and similar windows.

Figure 6:
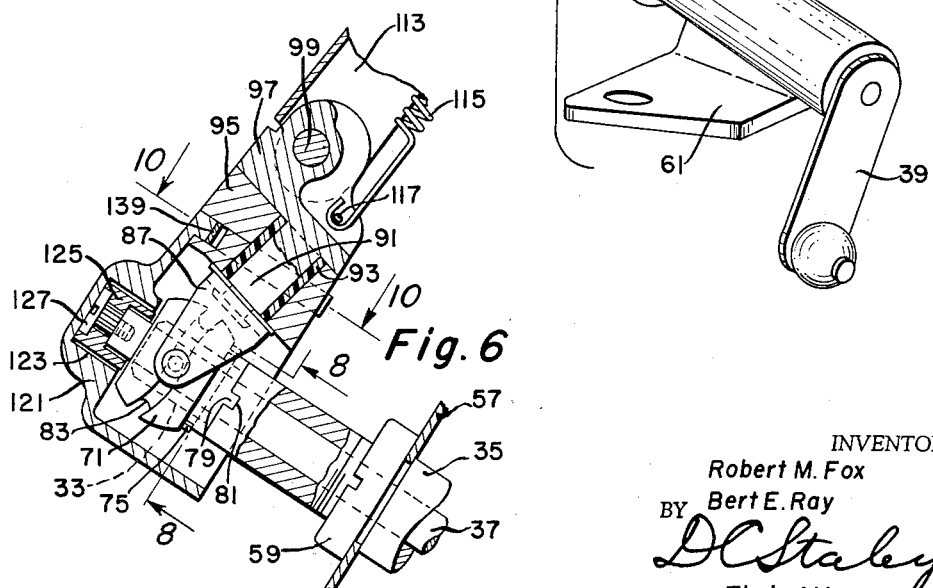
Figure 7:
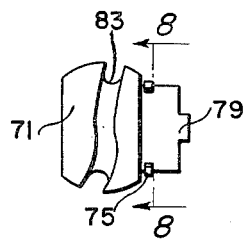
Figure 8:
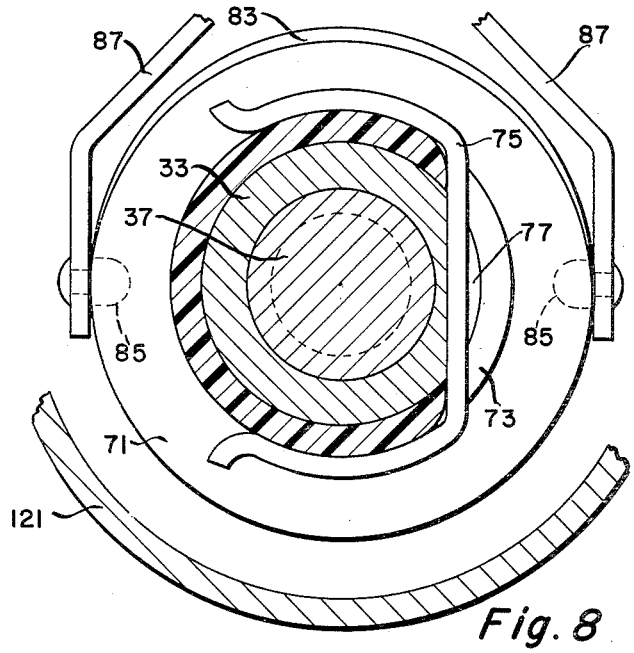

As explained in Patents 2,691,186 and 2,781,540, issued on October 12, 1954, and February 19, 1957, respectively, there is a particular problem of keeping a windshield wiper blade at a satisfactory angle to the glass throughout the stroke on a curved or wrap-around windshield. In said patents, a fixed cam adjacent to the drive shaft governs the angle of the blade throughout its stroke to keep the blade substantially normal to the surface of the glass. To accomplish this, the drive shaft 19 in Patent 2,691,186 was required to be axially movable while a slidable cam follower 60 was required in FIGURES 1 to 6 of Patent 2,781,540. In FIGURES 7 and 8 of this later patent, the drive shaft 14 was made axially movable similarly to the drive shaft 19 in Patent 2,691,186. It was found in such arrangement that there was a tendency for binding between the fixed cam and its follower.

It is an object of this invention to provide a simple, cam-operated arrangement for controlling the angle of a windshield wiper blade throughout its stroke on a curved or wrap-around windshield which will not require axial movement of the drive shaft or a radially slidable cam follower and which will not bind.

It is another object of this invention to provide an ornamental concealing arrangement for such a cam arrangement.

These and other objects are attained in the drawings in which, in one form, the wiper blade is made to rotate upon an axis which intersects the drive shaft. A cylindrical or spherical cam of either the plate or groove type having an axially contoured operating surface is aligned with said axis and cooperates with a forked type of cam follower having cam engaging contacts upon diametrically opposite contact points with the cam which are perpendicular to the axis of rotation of the wiper blade. The cam is designed to have rises on one side equal to the falls diametrically opposite to eliminate any necessity for axial movement of the drive shaft. The anchored section of the wiper blade may be extended to form an enclosing housing for the cam and cam follower.

In a second form, the wiper blade is made rotatable upon an axis which is offset from the axis of the drive shaft. The pivoting axis is connected to the drive shaft by a curved portion. The wiper blade is rotated by an eccentrically located cam follower which operates in a plane substantially tangent to the surface of the cylindrical cam which may be either of the plate or groove type.

In either form, the cam follower operates in a plane substantially tangent to the axially contoured operating surface of the cam so that binding is minimized and there is no necessity for either the drive shaft to be axially movable or the cam follower to be radially slidable as in the aforementioned patents.

Further objects and advantages of the present invention will be apparent from the following description, reference being had to the accompanying drawings wherein preferred embodiments of the present invention are clearly shown.

2

Figure 5:
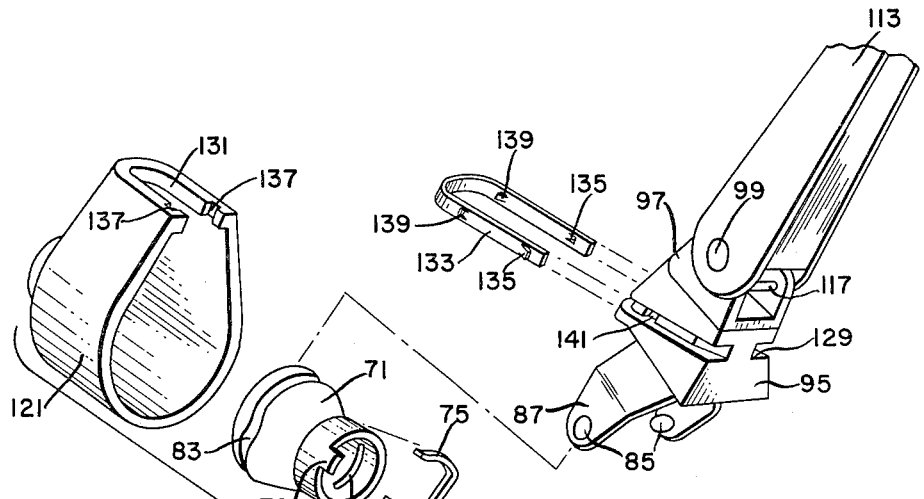
Figure 9:
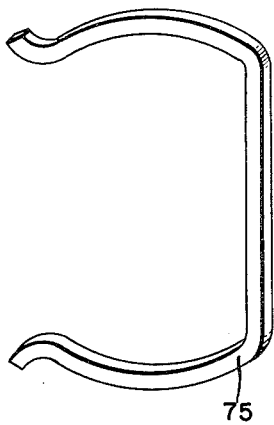
Figure 10:
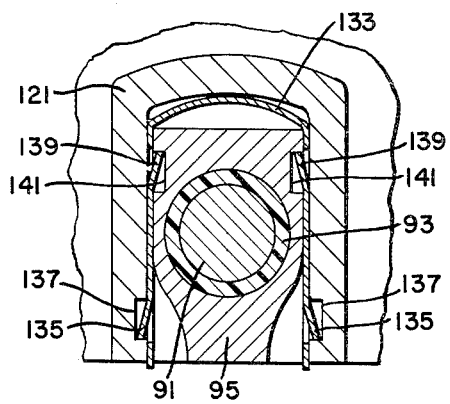

In the drawings:
FIGURE 1 is a perspective view of a cowl and windshield of an automobile embodying one form of our invention;
FIGURE 2 is an exploded perspective view of the drive shaft and cam potion of the wiper mechanism;
FIGURE 3 is a fragmentary sectional view taken along the line 3—3 of FIGURE 4 showing the drive shaft, cam and pivoting arrangement shown in FIGURE 2;
FIGURE 4 is a fragmentary sectional view taken along the line 4—4 of FIGURE 3;
FIGURE 5 is an exploded perspective view of a modified form of the invention incorporating a groove type of cylindrical cam;
FIGURE 6 is a fragmentary sectional view somewhat similar to FIGURE 3 applied to the form shown in FIGURE 5;
FIGURE 7 is a view in elevation of the cylindrical cam shown in FIGURES 5 and 6;
FIGURE 8 is a fragmentary sectional view taken along the line 8—8 of FIGURES 6 and 7;
FIGURE 9 is a perspective view of the C spring for retaining the cam upon the housing sleeve;
FIGURE 10 is a fragmentary sectional view taken along the line 10—10 of FIGURE 6;
FIGURE 11 is a top view, partly in section, of the offset type of wiper mechanism employing a cylindrical groove type of cam;
FIGURE 12 is a fragmentary sectional view taken along the line 12—12 of FIGURE 11;
FIGURE 13 is a fragmentary sectional view taken along the line 13—13 of FIGURE 11;
FIGURE 14 is a fragmentary sectional view taken along the line 14—14 of FIGURE 13;
FIGURE 15 is a sectional view of the groove type cylindrical cam shown in FIGURES 11 and 12;
FIGURE 16 is a development of the cam groove of the cylindrical cam shown in FIGURE 15;
FIGURE 17 is a modified form of the offset type having an exposed groove type of cylindrical cam;
FIGURE 18 is a vertical sectional view taken along the line 18—18 of FIGURE 17;
FIGURE 19 is a vertical sectional view taken along the line 19—19 of FIGURE 17;
FIGURE 20 is a vertical transverse stepped sectional view taken along the line 20—20 of FIGURES 18 and 19;
FIGURE 21 is a top view of the offset type of wiper mechanism having an exposed plate-type cylindrical cam;
FIGURE 22 is a fragmentary vertical sectional view taken along the line 22—22 of FIGURE 21;
FIGURE 23 is a fragmentary vertical sectional view taken along the line 23—23 of FIGURE 21; and
FIGURE 24 is a fragmentary transverse sectional view taken along the line 24—24 of FIGURE 21.

Referring now more particularly to the drawings, and especially to FIGURE 1, there is shown the cowl and windshield portion of an automobile 10 provided with a wrap-around windshield 11 having a pronounced curvature at its sides. There is a wiper blade 12 carried upon the end of the wiper arm 13.

Referring now more particularly to FIGURES 2 and 3, the wiper arm is formed as a channel having its opening facing the glass and provided with ears at its inner end carrying the pivot pin 15. The pivot pin 15 also extends through a rotatable member 17 having a U-shaped portion extending between the ears at the inner end of the wiper arm 13 which likewise receive the pivot pin 15 to form a pivotal connection with the wiper arm 13. As is customary, there preferably is a flat spring or a coil spring between the member 17 and the arm 13 providing a resilient force to cause the wiper arm 13 to press the blade 12 against the glass. The rotatable member 17 has an inwardly extending pivot stub shaft 19 which is rotatably mounted in a prelubricated porous metal bearing sleeve 21 provided in the anchor block 23.

Upon the inner face of the anchor block 23, the stub shaft 19 protrudes sufficiently to have riveted thereto the double forked cam follower 25 in the form of an upper fork and a lower fork. The four forked ends carry U-shaped shoes 27 of nylon or other suitable plastic carrying ball-shaped projections on their adjacent faces for contact with the diametrically opposite points upon the plate type cylindrical cam 29. This plate type cylindrical cam 29 has a relatively long cylindrical hub 31 which fits over an anchoring sleeve 33 projecting from the bearing portion 35 of the drive shaft 37. The drive shaft 37 is reversibly operated by the crank 39 through conventional operating mechanism which may be of the type shown in FIGURE 5 of the aforementioned Patent 2,691,186. The sleeve 33 is provided with notches upon its diametrically opposite sides and the hub 31 is provided with slots 41 on its diametrically opposite sides which substantially correspond to the notches 39. The hub 31 is slipped onto the sleeve 33 until the slots 41 are aligned with the notches 39. The U-shaped or C-shaped spring clip 43 is then clipped over the hub 31 with its sides extending through the slots 41 into the notches 39 to firmly hold the cam 29 upon the anchoring sleeve 33 in such a way as to prevent axial movement thereof upon the sleeve 33. The bearing 35 has a projecting tongue 36 extending into the notch 38 in the hub 31 of the cam 29 to prevent rotational movement on the sleeve 33. The U-shaped shoes 27 of the follower 25 straddle the diametrically opposite points of the cam 29 on a line that is perpendicular to the axis of rotation of the stub shaft 19 as illustrated in FIGURES 3 and 4.

The cam 29 and the cam follower 25 are enclosed in an ornamental cap type housing 45 having a notch 47 in one side provided with a continuous inwardly extending projection 49 which slides into the grooving 51 extending around both sides and top of the block 23 so as to connect the block 23 and the housing 45 together to form an anchoring unit for the wiper arm 13. The housing 45 is locked to the anchor block 23 by the set screws 63 which thread through the threaded holes 65 in the housing 45 into aligned notches in the block 23. The housing 45 has an inner splined recess or socket 53 into which fits the splined head 55 at the outer end of the drive shaft 37. The bearing portion 35 is fastened to the sheet metal structure 57 of the cowl of the automobile 10 by the flat nut 59 and the ears 61 to provide an anchorage for the sleeve 33 and the bearing portion 35.

In operation, as the crank arm 39 is oscillated to reversibly operate the drive shaft 37, the splined head 55, the housing 45, the anchoring block 23 and the wiper arm 13 and the blade 12 oscillate with it. The plate type cylindrical cam 29 is so shaped that during the sweeping movement of the arm 13, it will control the angle of the wiper arm 13 and the blade 12 through the forked cam follower 25, the stub shaft 19, the U-shaped member 17, the pivot pin 15, the wiper arm 13 and the blade 12. The location of the ball-shaped contact points upon the U-shaped shoes 27 at diametrically opposite points upon the cam 29 perpendicular to axis of the stub shaft 19 makes it possible to so design the cam that there will be no axial movement or axial thrust upon the shaft 37 so that no axial movement need be provided for the shaft 37 nor need there be radially slidable connections for the cam follower 25.

The axis of the stub shaft 19 and the bearing 21 is aligned directly with the periphery of the cam 29 and intersects the axis of the drive shaft 37. To prevent any axial thrust upon the drive shaft 37, the turning movement of the wiper arm 13 is accomplished by providing a rise on the cam 29 diametrically opposite and equal to a fall on the opposite side of the cam surface in order to turn the wiper arm 13 to the angle desired. By designing the cam on this principle throughout, it is unnecessary to provide for any axial movement of the drive shaft 37 or any radially slidable movement of the cam follower 25 such as is provided for in the aforementioned patents, since the contact points on the cam follower and the axis of the drive shaft 37 define a plane at all times. A line connecting the diametrically opposed contact points on the cam follower always intersects the axis of the drive shaft 27, and it is this "on-center" relationship between the cam follower means and the axis of the drive shaft which eliminates the necessity for having either a floating drive shaft or a floating cam follower. The diametrically opposite location of the rounded portions of the contact shoes 27 substantially prevents binding between these shoes and the cam 29. The fork-shaped cam follower 25 may also be of spring metal provided with sufficient inward spring force to prevent undesirable play between the shoes 27 and the surface of the cam 29.

Referring now more particularly to FIGURES 5 to 10 inclusive, the bearing portion 35, the anchoring sleeve 33, the mounting ears 61, the crank 39, the drive shaft 37, and the splined portion 55 are identical to the corresponding parts in FIGURES 1 to 4. Instead of the plate type cylindrical cam 29, there is substituted a cast or molded cylindrical type spherical cam 71 of nylon or other plastic or metal which fits onto the anchoring sleeve 33 and contains a slot 73 through which the flat yoke portion of the C-shaped spring washer 75 shown in FIGURE 9 extends into an aligned notch 77 in the anchoring sleeve 33 (FIGURE 8) to hold the cam 71 from axial movement relative to the sleeve 33. The adjacent end of the cam 71 is provided with a square tongue 79 which extends into a square notch 81 provided upon the adjacent end of the bearing 35 to prevent rotation of the cam 71 relative to the sleeve 33.

The cam 71 is provided with a spherical or cylindrical cam groove 83 which receives, at diametrically opposite points, the round nosed, conically-shaped cam follower pins 85 extending inwardly from the ends of the cam follower fork 87 as shown in FIGURES 5 and 6. The cam follower fork is riveted to the adjacent end of the stub shaft 91 which is rotatably mounted in the bearing 93 in the anchor block 95. The axis of the stub shaft 91 and the bearing 93 intersects the axis of the drive shaft 37 and also intersects at right angles the axis of the cam follower points 85. The cam groove 83 is designed so as to have a rise on one side equal to the fall on the diametrically opposite side so that there will be no axial thrust on the shaft 37 nor any radial thrust on the cam follower fork 87 to eliminate any need for axial movement of the shaft or a radially slidable cam follower as is required in the initially mentioned patents.

The stub shaft 91 is cast integral with a U-shaped portion 97 carrying the pivot pin 99. The pivot pin 99 also extends through the ears of the channel-shaped wiper arm 113 which preferably has a wiper blade connected at its outer end as shown in FIGURE 1. Pressure of the wiper blade against the glass is provided by a tension type coil spring 115 extending from a point of anchorage on the wiper arm 113 to a pin 117 extending through the ears of the pivot portion 97.

The cam 71 and its follower fork 87 are enclosed in the die cast housing 121 having an extensive skirt which surrounds them. This housing has a head portion provided with a splined socket 123 which receives a splined sleeve 125 having an inner splined bore which fits onto the splined head 55 on the shaft 37. A screw 127 threads through the sleeve 125 into the outer end of the drive shaft 37 to fasten the sleeve 125 and the housing 121 thereon. The sleeve 125 provides a driving connection between the shaft 37 and the housing 121. On three of its exposed faces, the anchor block 95 is provided with a set of continuous deep grooves 129. The housing 121 is provided with a flanged opening 131. This flanged opening 131 is locked into the grooves 129 of the anchoring block 95 by a U-shaped spring clip 133 having struck out, downwardly extending projections 135 engaging the notches 137 in the opening 131 as shown in FIGURE 10. The U-shaped clip 133 also has a set of inwardly struck projections 139 entering into the notches 141 in the grooves 129 of the anchoring block 95 as shown in FIGURE 10. Through this arrangement, the housing 121 may be readily connected to the anchoring block 95 through the intervention of the U-shaped clip 139 in the notched groove 129 as shown in FIGURES 1 to 10.

In FIGURES 11 to 15, instead of providing a forked type of cam follower located on an axis of rotation which intersects the drive shaft, the axis of rotation is offset and a single cam follower arm extends at right angles from the pivoting axis and carries an eccentrically located follower which operates substantially in the plane of a tangent to the cam so that there is no axial thrust or movement of the drive shaft nor is there any radial movement required of the cam follower as in the initially mentioned patents. In this embodiment, as well as in the embodiments of FIGURES 17 through 20 and 21 through 24, the contact point, or points, of the cam follower define a plane with the axis of the drive shaft. The drive shaft 220 is rotatably mounted in a sleeve 222 fastened by a suitable nut 224 to the cowl 226 of an automobile as shown in FIGURE 12. Fastened to the top of the drive shaft 220 is an inner and outer splined ring 228 fitting onto the reduced end of the shaft 220 and receiving the splined socket of the anchored section 230 of the wiper arm. This anchored section 230 has side walls 232 extending around and enclosing the cylindrical type cam 234 which is fixed to the reduced extension 236 of the sleeve 222. A small bearing 238 may be provided between the outer end of the shaft 220 and the outer end of the extension 236 of the sleeve 220.

The anchored section 230 is provided with a bearing sleeve 240 of prelubricated sintered powdered metal which receives the stub shaft 242. The axis of the stub shaft may be either perpendicular or at an acute angle to the axis of the drive shaft 220 but offset from the axis, as shown in FIGURE 11, a distance about equal to the radius of the cam 234. Because of this angular relationship of the stub shaft 242 and the bearing 240, the groove 244 in the cam 234 is in the nature of a V groove in a conical surface, as illustrated in FIGURES 15 and 16. The groove 244 receives a round nosed, conical-shaped cam follower 246 eccentrically located relative to the axis of the bearing 242 on the cam arm 248 which is riveted to and extends perpendicularly to the inner end of the stub shaft 242. The cam arm 248 moves substantially in the plane of a tangent to the operating surface of the cam 234 which also is substantially perpendicular to the axis of the shaft 242 and its bearing 240.

The outer end of the stub shaft 242 is provided with a reduced extension 243 riveted to an anchoring block 250 carrying the pivot pin 252 providing a pivotal connection with the ears of the wiper arm 254 which corresponds to the wiper arms 13 and 113 in the previous figures. The anchoring block 250 is also provided with a pin 256 to which the customary tension spring may be attached corresponding to the spring 115 in FIGURE 6 and the spring 35 in Patent 2,781,540. The wiper arm 254 connects to a wiper blade such as is indicated by the reference character 12 in FIGURE 1 and the reference character 31 in Patent 2,781,540.

By virtue of this cam and cam follower arrangement, as the drive shaft 220 reverses, it moves the anchored section 230 and the wiper arm 254 back and forth through an arc as described in the Patent 2,781,540. The cam arm 248 and its follower 246 are simultaneously moved back and forth in the groove 244 to cause the blade and the wiper arm 254 to be turned to the angle determined by the design of the groove in the cam 234. This groove 244 is preferably so designed that it keeps the blade connected to the wiper arm 254 at a satisfactory angle throughout its entire travel over any specific curved or wrap-around windshield. In general, it is desired to keep the blade substantially perpendicular at all points and at all times throughout the wiping stroke. By reason of the particular relationship and alignment of the shaft 242, the arm 248, the follower 246 and the cam groove 244, this is accomplished without any axial movement or thrust upon the operating shaft 220 and no radially movable cam follower or follower arm is required.

In FIGURES 17 to 20, there is shown another form of offset arrangement in which, however, no enclosure is provided for the cam in order to reduce the size of the anchored section. In this form, as best shown in FIGURE 18, the reversible drive shaft 331 is rotatably mounted in a sleeve 337 which is fastened to the cowl of an automobile 10 by a nut 333. Fastened to the reduced extension of this sleeve 337 is a conical cam 335 of the cylindrical type. A small bearing may be provided between the outer end of the sleeve 337 and the shaft 331. The outer end of the shaft 331 has riveted thereto a splined ring 339 fitting into a splined socket in the anchored section 341 of the wiper arm. This anchored section 341 is fastened to the outer end of the drive shaft 331 by a screw 343. The anchored section 341 of the wiper arm is provided with a stub shaft 345. This stub shaft 345 has a reduced extension 347. An anchor block 349 contains a bearing sleeve 351 of sintered powdered prelubricated metal which receives the stub shaft 345. The reduced extension 347 of the stub shaft 345 extends through a smaller aperture in the block 349 and is riveted over to prevent relative axial movement but permitting relative rotation between the block 349 and the stub shaft 345. This particular construction allows the eccentrically located cam follower 353 to be fixed upon a lateral extension 355 of the anchor block 349. This round nosed conical-shaped cam follower 353 extends into the cylindrical type of cam groove in the conical-shaped portion of the cam 335 in a manner similar to the follower 246 and the cam 234 of the embodiment shown in FIGURES 11 to 16.

The anchor block 349 carries the pivot pin 357 providing a pivotal connection with the ears at the inner end of the wiper carrying arm 359 in the manner similar to that shown in the previously described embodiments and said patents. The anchor block also carries a pin 361 to which the tension spring may be fastened.

This embodiment operates in a manner very similar to that described in the previous embodiments. The reversing rotation of the drive shaft 331 causes the anchored section 341 and the wiper carrying arm 359 to be moved back and forth through an arc. To keep the blade carried by the wiper carrying arm 359 substantially perpendicular to the glass at all times, the groove in the cam 335 guides the eccentrically located cam follower so that the anchoring block 349 and the arm 359 are turned as they swing through the arc to the proper angle to keep the wiper blade substantially perpendicular to the glass at all points of contact. The axis of cam follower 353 defines a plane with the axis of the drive shaft 331 and swings through an arc which is substantially tangent to the cam 335 at all times. The effective cam follower arm of the cam follower 353 is substantially tangent to the cam 335 and perpendicular to the pivoting axis of the shaft 345 and the bearing 351. The line intersecting the cam follower 353 and the axis of the shaft 331 is in a plane parallel to the axis of the stub shaft 345 and its bearing 351. By this arrangement, no axial movement of the shaft 331 nor any radial movement of the cam follower is required to provide the cam controlled positioning of the wiper blade 12 to keep a satisfactory angle throughout its arc of movement with the surface of the glass.

Referring now more particularly to FIGURES 21 to 24, there is shown another offset arrangement in which a cylindrical type of plate cam 430 is fastened by a nut 432 to the outer end of a sleeve 434 serving as a bearing for the reversible drive shaft 436 operated through a crank arm 437. The sleeve 434 has an integral extension 438 which may be fastened to the cowl of the automobile 10. The outer end of the drive shaft 436 has riveted thereto a splined ring 440 having a peripheral groove 441 onto which is pressed the splined socket 442 of the anchored section 444 of the wiper arm. The socket 442 is held in position by a threaded pin 443. The anchored section 444 is provided with a hollow stub shaft extension 446 extending into a bearing sleeve 448 provided in the anchoring block 450. The anchoring block 450 is held in place axially by a bolt 452 extending through the center of the stub shaft 446.

The anchoring block 450 carries the pivot pin 454 which also extends through the ears of the wiper carrying arm 456 carrying the wiper blade at its outer end (not shown) corresponding to the blade 12 in FIGURE 1. The pressure of the blade upon the glass is provided by a tension spring 458 anchored to the pin 460 upon the anchor block 450. The anchor block 450 is provided with an integral, lateral, U-shaped extension 462 carrying a U-shaped nylon insert 464 having rounded, inwardly facing knobs extending toward each other substantially into contact with the periphery of the plate cam 430 as best shown in FIGURES 22 and 24. The points of contact between the nylon insert 464 and the cam 430 are substantially at a tangent which is perpendicular to the axis of the stub shaft 446 and the bearing 448. The line 22—22 extending from the insert 464 to the axis of the drive shaft 436 is substantially in a plane parallel (23—23) to the pivoting axis of the stub shaft 446 and spaced a distance greater than one-half the effective radius of the cam 430. The nylon insert 464 is in the form of a forked type of cam follower eccentrically located relative to the pivoting axis of the stub shaft 446 and, in effect, is upon a cam follower arm which is perpendicular to the pivoting axis of the stub shaft 446 in a plane which is tangent to the cam 430 at the points of contact therewith.

By this arrangement, as the drive shaft 436, the anchored section 444 and the wiper carrying arm 456 move back and forth through an arc, the engagement between the cam 430 and the cam follower 462 adjusts the angle of the anchor block 450, the wiper carrying arm 456 and the blade carried thereby in accordance with the contour of the cam 430. The contour of this cam 430 is so designed as to keep the blade substantially normal to the glass at all times. The follower contact surface of the glass at all times. The follower 464 and the cam 430 are also so designed that there is no axial movement of the shaft 436.

Thus, I have provided various forms of cam-controlled wiper blades in which no axial movement is required of the drive shaft nor is there any radially slidable cam follower required. The construction substantially eliminates binding between the cams and cam followers and is relatively simple and low in cost. The cams and cam followers may be enclosed or they may be open and the anchored section reduced in size accordingly.

While the embodiments of the present invention as herein described constitute preferred forms, it is to be understood that other forms might be adopted.

What is claimed is as follows:

1. A windshield wiper for curved windshields including a reversible drive shaft, a wiper arm having a section anchored to said shaft and an elongated wiper carrying section, a pivotal connection having an axis extending generally longitudinally of said wiper carrying section for pivotally connecting said wiper carrying section to said anchored section, a fixed cylindrical type cam with an axially contoured operating surface and having its axis substantially coincident with the axis of said drive shaft, a cam follower fixed to said wiper carrying section and having point contact means defining a plane with the axis of the drive shaft and being in engagement with the axially contoured operating surface of said cam for turning said wiper carrying section relative to the anchored section as the drive shaft operates without axial movement thereof, said anchoring section extending about and forming a housing covering said cam.

2. A windshield wiper for curved windshields including a reversible drive shaft, a wiper arm having a section anchored to said shaft and an elongated wiper carrying section, a pivotal connection having an axis extending generally longitudinally of said wiper carrying section for pivotally connecting said wiper carrying section to said anchored section, a fixed cylindrical type cam having its axis substantially coincident with the axis of said drive shaft, the axis of said pivotal connection being offset a substantial distance from said drive shaft, said anchored section extending from said drive shaft in a curve having its terminus substantially coinciding with the adjacent end of the wiper carrying section, a cam follower arm fixed to said wiper carrying section and having thereon a cam engaging follower eccentrically located relative to the pivoting axis of said wiper carrying section and extending into engagement with said cam adjacent a tangent to the cam which is substantially perpendicular to the axis of said pivotal connection for turning said wiper carrying section relative to the anchored section as the drive shaft operates without axial movement.

References Cited in the file of this patent

UNITED STATES PATENTS

| | | |
|---|---|---|
| 2,079,399 | Drew et al. | May 4, 1937 |
| 2,781,540 | Deibel | Feb. 19, 1957 |
| 2,869,167 | Deibel et al. | Jan. 20, 1959 |
| 2,910,716 | Makela et al. | Nov. 3, 1959 |